Aug. 3, 1954   G. M. HOOD   2,685,499
METHOD OF PREPARING BLANC FIXE

Filed Dec. 21, 1950                              2 Sheets-Sheet 1

GLAY M. HOOD
Inventor

By Daniel I. Mayne
Scranton C. Van Houten
Attorneys

Patented Aug. 3, 1954

2,685,499

UNITED STATES PATENT OFFICE 2,685,499

METHOD OF PREPARING BLANC FIXE

Glay M. Hood, Rochester, N. Y., assignor to Eastman Kodak Company, Rochester, N. Y., a corporation of New Jersey Application December 21, 1950, Serial No. 202,004

4 Claims. (Cl. 23—122)

This invention relates to a method of preparing blanc fixe or barium sulfate by reacting barium chloride and a water soluble sulfate under conditions such that the content of sulfate ion in the reaction is in a greater equivalent amount than the barium ion, over substantially the entire area in which the reaction is occurring.

Various methods have been described for the preparation of barium sulfate and most of the improvements in recent years have been directed to control of the grain size thereof. In those prior processes the barium ion has either been in excess of the sulfate ion or in an amount equivalent thereto. In a fine art such as photography, the properties of the barium sulfate which is employed in preparing photographic paper is sometimes critical. Many of the described methods of preparing barium sulfate in which grain size was regulated were directed to the preparation of barium sulfate for photographic purposes.

Figure 1:
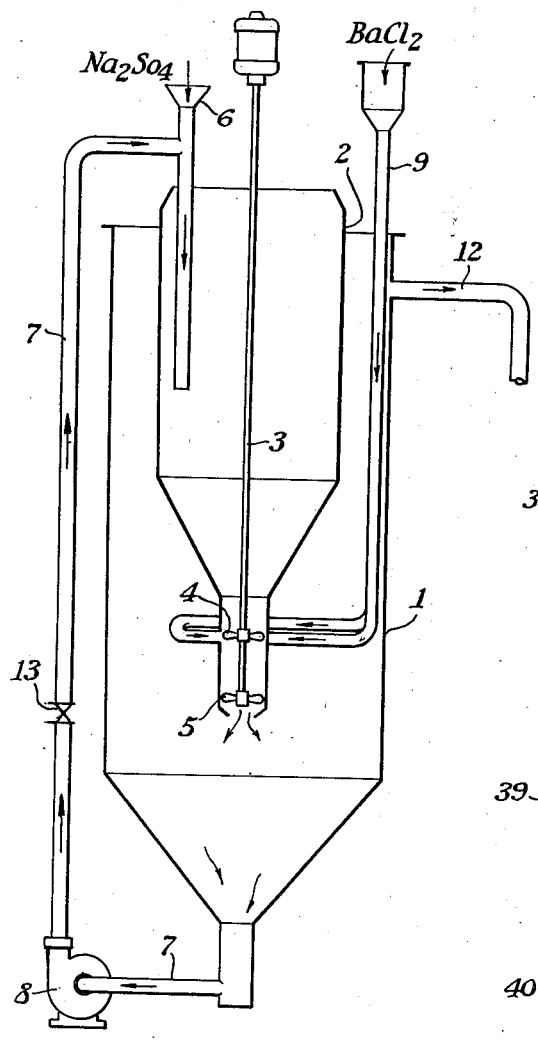
Figure 2:
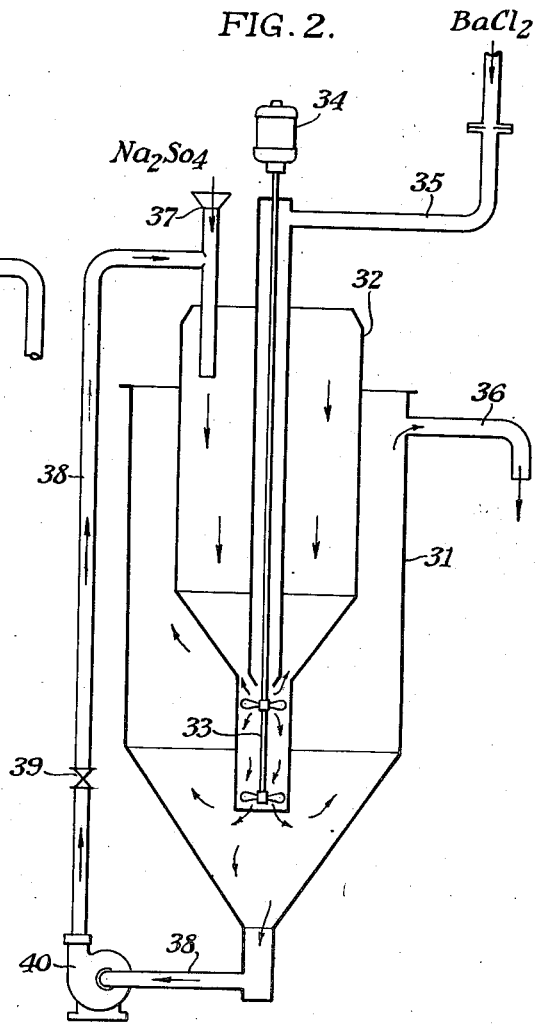
Figure 3:
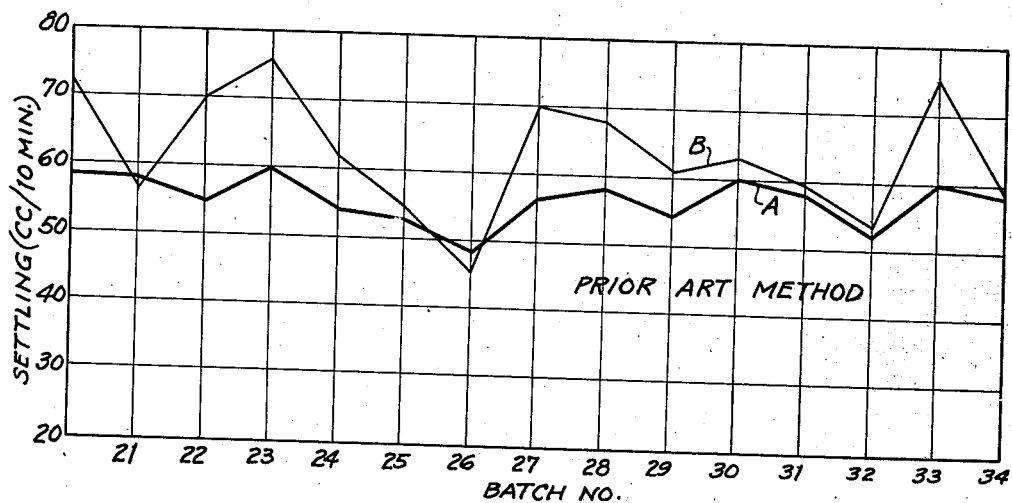

I have found that in barium sulfate as usually prepared often considerable variation in color occurs which is undesirable. For instance in some cases the color of the barium sulfate may even tend towards pinkness. Also the baryta surface obtained with many of the barium sulfates prepared at the present time exhibits a greater degree of roughness than is desired in photographic paper. I have found that these undesirable characteristics are due to the adsorption or occlusion of sulfate ions in the barium sulfate, which ions are difficult to remove by ordinary washing methods. I have found that the proportion of the sulfate ion to the barium ion in the reaction mass is critical as regards the occlsuion of sulfate ions and the resistance to their removal by washing in the case of barium sulfate which has been prepared by reacting barium chloride and alkali metal sulfate. Therefore, I have developed a process for preparing barium sulfate in which the sulfate ion is in greater equivalent amount than the barium ion over substantially the entire area in which the reaction is carried out. I have accomplished this by dispersing the barium ion as rapidly as possible in the reaction mass so that there is very little chance for the objectionable occlusion of the sulfate ion to occur. In the accompanying drawings, Figures 1 and 2 illustrate apparatus in which processes can be carried out in accordance with my invention. Figure 3 is a graphic representation wherein the products obtained by my process are compared with the products obtained by processes which are usually employed in the prior art.

Figure 1 shows a combination of apparatus for preparing barium sulfate which comprises a tank 1 in the interior of which a chamber 2 narrowing down to a throat is located. This chamber is provided with a stirrer 3, provided with two agitating blades 4 and 5. The sulfate ion is supplied by means of passages 6 and 7, passage 6 being for the introduction of fresh sulfate ion and 7 providing for the recirculation of slurry from the tank 1 by means of pump 8. This recirculation line is provided with a valve 13 so that the amount of slurry recirculated can be controlled. Chamber 2 is also provided with a supply of barium chloride solution which is introduced through the two branches of conduit 9, the barium chloride being introduced adjacent blade 4 to assure rapid dispersion of the barium ion into the reaction mass. Tank 1 is provided with overflow 12 from which barium sulfate slurry is discharged from which slurry the barium sulfate is recovered.

Figure 2 illustrates a modified type of reaction apparatus comprising tank 31 the interior of which is provided with a chamber 32 and a conduit 35 through which the barium chloride can be supplied. Conduit 35 narrows down to an opening directly above one of the blades of stirring element 33 with which chamber 32 is provided. This stirrer 33 is rotated by means of some source of mechanical rotation such as an electric motor designated 34. The sulfate ion is supplied by introducing some fresh alkali metal sulfate through conduit 37 and by recirculating slurry through conduit 38 from tank 31 by means of pump 40. Conduit 38 is supplied with a valve 39 by which the amount of recirculated slurry can be regulated. Tank 31 is also supplied with an overflow 36 from which slurry is withdrawn for the recovery of the barium sulfate therefrom.

Figure 4:
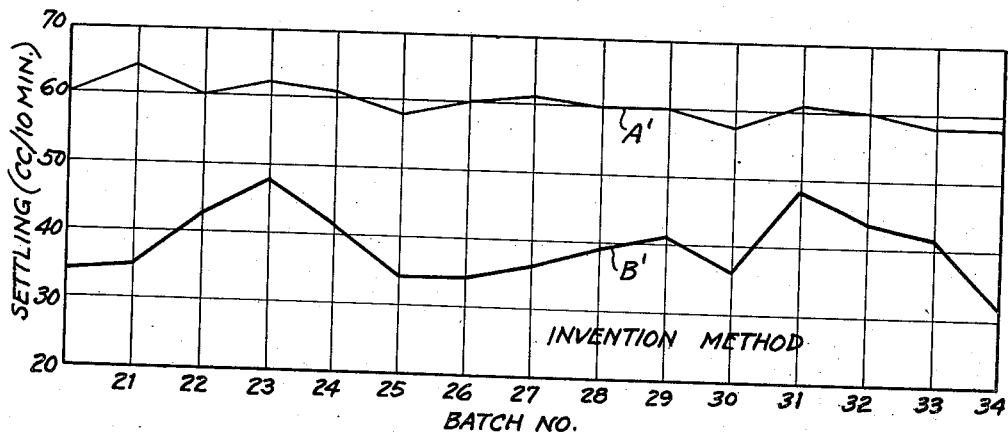

Figures 3 and 4 illustrate the values obtained using representative batches of sulfate prepared in accordance with the process described herein and products prepared by prior art processes. Lines A and $A^1$ indicate the amount of settling of the product in 10 minutes as it is withdrawn from the apparatus described, in the form of slurry. In order to test for adsorption or occlusion of sulfate ion the slurry is allowed to stand for five hours and then the degree of settling is determined by agitating and allowing to stand for ten minutes which values are designated B and $B^1$. If the amount of settling is less than before the five hours' standing, this indicates that the sulfate ions are readily removable from the barium sulfate while an increase of the settling on standing is indicative of a type of adsorption or occlusion of sulfate ions difficult to remove. The values given in Figures 3 and 4 are the ccs. of clear aqueous liquid which remain above the white barium sulfate after allowing the slurry to stand for ten minutes. These results indicate that in most every case using prior art methods, the degree of settling is increased and in those cases where it is not increased the degree of settling is but little less than that which occurs before the settling test has been applied. With barium sulfate prepared by the method described herein, however, the amount of settling of the slurry after allowing to stand is much less than that of the slurry when immediately prepared, which indicates by this test that a substantial improvement in the ease of removal of sulfate ions from barium sulfate is obtained over the ease of removal of sulfate ions from barium sulfates heretofore prepared.

My invention is accomplished by introducing a greater equivalent proportion of sulfate ions than of barium ions into the reaction mass and by subjecting the barium chloride which is introduced to immediate agitation thereby dispersing the barium ions in the alkali metal sulfate solution. This makes certain that the barium ion is in the minority over substantially the entire volume where the reaction is being carried out as compared with the sulfate ion, i. e. in not over 5 percent of this volume should the barium ion predominate over the sulfate ion and preferably this volume where the barium ion is greater than or equal to the sulfate ion should be the barest minimum.

In conjunction with the agitation and conditions of introducing the BaCl₂ solution shown, the predominance of sulfate ion over barium ion can be obtained in two ways (1) by introducing the two solutions at the same rate with the sulfate solution in greater concentration than the barium chloride solution or (2) passing the sulfate solution through the reaction space in a greater amount or at a greater rate than the barium ion. In the apparatus illustrated substantially all of the barium ion has reacted when the liquid passes from the throat of the chamber. I have found that a throat of four-inch diameter and six-inch depth is quite satisfactory in the usual operation of my process although this may vary from one case to another, depending of course on the scale of the operation. Also it is desirable that the impellers or stirring elements cut a cross sectional area approaching that of the region in which they are located. In carrying out the process in accordance with my invention, the liquids may be passed through the throat at a rate from five to fifty gallons per minute, this rate of flow being optional with the individual operator. With a faster rate of flow ordinarily it is desirable to have a longer or larger throat in order to assure the complete reaction of the barium ion under maximum conditions of agitation. The stirring elements can be run at a rate of 750 R. P. M., although here again this value is not critical and may be varied from one case to the next. It is ordinarily desirable that the process be carried out under conditions of substantial dilution as I have found that by using fairly dilute solutions of barium and sulfate ions the particle size of the barium sulfate which is obtained is not as fine as where more concentrated solutions are employed. An essential element of my invention is the agitation of the material as it is brought together as pointed out above to assure a minimum of area in which barium ion predominates.

Various speeds of rotation of the stirring elements have been used. In some cases an R. P. M. of as low as 100 might be suitable while in other cases higher speeds are desirable such as a range of 100–3,000 R. P. M. or more, the speed of agitation being dependent upon the rate at which the liquid is introduced and the size of the throat. The criterion as to agitation is that it is sufficient that the area in which barium ion predominates over sulfate ion figured on the basis of equivalent weights in the reaction chamber be at a bare minimum and at least not more than five per cent.

In carrying out the process in accordance with my invention ordinarily the concentrations which will be most suitable will be those within the range of two to eight percent. In the reaction throat and in the tank into which the slurry is passed ordinarily the sulfate ion content in grams per liter will be 2–6, although as explained above some variation may take place from these values. As sodium sulfate is the most commonly available sulfate salt, that compound will be generally used in processes in accordance with my invention. Other sulfates such as of potassium or ammonium or in fact any water soluble sulfate may be employed if desired. The products obtained in accordance with my invention have been found to be eminently suitable for use for the baryta coating of photographic paper, and the surfaces which have resulted have been extraordinarily smooth and free from any blemishes. Also the products prepared in accordance with my invention have shown great stability as to color as distinguished from products obtained in many processes for the preparation of barium sulfate. I have found that normal temperature is ordinarily satisfactory in the carrying out of my process, as up to date the process has worked satisfactorily without adjusting the temperature and has given the desired results.

In its broadest aspects the preparation of barium sulfate in accordance with my invention ordinarily involves introducing BaCl₂ solution into an aqueous solution of a sulfate at a point where vigorous agitation is occurring (at least 100 R. P. M.) and under such conditions that the sulfate ion is present in greater equivalent amount than the barium ion, so that the vigorous agitation continues until substantially all of the barium ion is reacted with the SO₄ ion present.

The following example illustrates my invention:

Solutions of BaCl₂ and of Na₂SO₄ in water were prepared, the concentration of the BaCl₂ solution being at the rate of 139.64 gms. per l. of water and of the Na₂SO₄ being 109.82 gms. per liter of water, the dissolving of the salts in the water raising the temperature to 110° F. Referring to Figure 1, these solutions were introduced into the precipitating unit there shown, each at the rate of approximately 5 gallons per minute. The Na₂SO₄ solution was mixed with the recirculated slurry in a ratio of 1:17 for obtaining the desired conditions of dilution before coming in contact with the barium ion in the throat. This diluted mixture was passed thru the throat at a velocity of 3.06 feet per second and the BaCl₂ solution was introduced at 1.85 feet per second. The stirrer was operated at 1750 R. P. M., the blades being three-inch size and located four inches apart near the top and bottom of the throat. The velocity of the reagents and the stirrer together created a very high degree of turbulence in the throat or precipitating zone.

The slurry formed was recirculated to give the desired dilution and a portion of the slurry was withdrawn from the chamber to recover the barium sulfate therefrom. The barium sulfate recovered was readily susceptible to washing of the $SO_4$ ion therefrom.

During the operation of the unit samples were withdrawn from several different points and determinations were made both as to the $SO_4$ ion concentration and as to whether or not there was any excess of barium ion present at any one of those points. Those points and the findings were:

On bottom blade 5—2.05 g. $SO_4$ ion per l.—no excess Ba ion.
Halfway down outside chamber 2—2.68 g. $SO_4$ ion per l.—no excess Ba ion.
Unit discharge 12—2.68 g. $SO_4$ ion per l.—no excess Ba ion.
On top blade 4—5.27 g. $SO_4$ ion per l.—no excess Ba ion.
Halfway down inside chamber 2—6.95 g. $SO_4$ ion per l.—no excess Ba ion.

One of the outstanding features of my invention is the ability to control particle size thereby. I have found that a relationship exists between the flow rate of the reagents and the recirculated slurry in my process; for instance, if the ratio of sodium sulfate solution to recirculated slurry is low, a small particle size will result, and vice versa. Therefore, it is desirable in operating my method in order to obtain a particle size substantially within the limits of 0.26 to 0.4 in microns, to maintain the dilution ratio of the sodium sulfate solution to the recirculated slurry between the limits of 1:4 to 1:9.5. By this means, a product is obtained having the particle size substantially entirely within the range of 0.26–0.4 micron and a settling action of 20–75 ccs. per 10 minutes of settling.

Also, in the operation of my method, there is very little variation once the conditions of operation have been established. On setting the operation at a certain point, the settling properties of the precipitated slurry and the quantitative results of the average particle size are very uniform. Although there are no known reliable tests for measuring the percent distribution of particle sizes of the blanc fixe within the range given, nevertheless, there are several indications that the product obtained has a high degree of uniformity as compared with prior art methods. These indications are:

1. That the recirculated slurry settles at a faster rate, indicating greater uniformity of particle size than the regular fixe of the same average particle size.
2. The precipitation in the unit described has been shown by tests to be confined to a very small zone, and, therefore, it is to be expected that the size of substantially all of the particles will be very nearly the same. In other types of precipitation methods, the precipitation occurs over a wide area, thus giving cause for considerable variation from one particle to another.

I claim:
1. A method of preparing barium sulfate which is readily susceptible to the washing of occluded $SO_4$ ion therefrom, which comprises directly introducing into a constricted throat an aqueous solution of $BaCl_2$ and an aqueous solution of an alkali metal sulfate, the molar sulfate ion concentration of the liquid in the throat exceeding that of the barium ion for the entire period of the reaction throughout the volume of the throat except immediately adjacent the $BaCl_2$ inlet, the contact of the solutions being facilitated by mechanical stirring with a stirrer located within the throat and rotating at a rate of at least 100 R. P. M. in close proximity to the point of introduction of the $BaCl_2$ solution.

2. A method of preparing barium sulfate which is readily susceptible to the washing of occluded $SO_4$ ions therefrom, which comprises directly introducing into a constricted throat an aqueous solution of $BaCl_2$, an aqueous solution of an alkali metal sulfate and a recirculated slurry resulting from the action of the solutions in a proportion of alkali metal sulfate solution to recirculated slurry of 1:4 to 1:9.5, the molar sulfate ion concentration of the liquid in the throat exceeding that of the barium ion for the entire period of the reaction throughout the volume of the throat except immediately adjacent the $BaCl_2$ inlet, the contact of the solutions being facilitated by mechanical stirring with a stirrer located within the throat and rotating at a rate of at least 100 R. P. M. in close proximity to the point of introduction of the $BaCl_2$ solution.

3. A method of preparing barium sulfate having a uniform particle size and being readily susceptible to the washing of occluded $SO_4$ ions therefrom, which comprises passing through a constricted throat an aqueous solution of $BaCl_2$, an aqueous solution of an alkali metal sulfate, and a recirculated slurry resulting from the action of the solutions in a proportion of alkali metal sulfate solution to recirculated slurry of 1:4 to 1:9.5 under conditions whereby the sulfate ion concentration in the throat exceeds the barium ion concentration therein, at a rate of 5–50 gallons per minute, the solutions being intimately contacted by means of mechanical stirring by a stirrer rotating at a rate of at least 100 R. P. M.

4. A method of preparing barium sulfate having a uniform particle size and being readily susceptible to the washing of occluded $SO_4$ ions therefrom, which comprises passing through a constricted throat an aqueous solution of $BaCl_2$, an aqueous solution of sodium sulfate, and a recirculated slurry resulting from the action of the solutions in a proportion of sodium sulfate solution to recirculated slurry of 1:4 to 1:9.5 under conditions whereby the sulfate ion concentration in the throat exceeds the barium ion concentration therein, at a rate of 5–50 gallons per minute, the solutions being intimately contacted by means of mechanical stirring by a stirrer rotating at a rate of at least 100 R. P. M.

References Cited in the file of this patent

UNITED STATES PATENTS

| Number | Name | Date |
|---|---|---|
| 2,125,342 | Hall | Aug. 2, 1938 |
| 2,213,907 | Fleckenstein et al. | Sept. 3, 1940 |
| 2,358,050 | Boulet | Sept. 12, 1944 |

OTHER REFERENCES

Treadwell and Hall; "Analytical Chemistry," vol. II, Quantitative, 7th ed., John Wiley and Sons, N. Y., 1930, pages 400–405.

Johnston and Adams: "Phenomenon or Occlusion in Precipitates of Barium Sulfate," J. Am. Chem. Soc., 1911, vol. 33, part 1, pages 829–845.